(12) United States Patent
Wittmer

(10) Patent No.: US 7,988,089 B2
(45) Date of Patent: Aug. 2, 2011

(54) SWASHPLATE TRAJECTORY CONTROL

(75) Inventor: Kenneth S. Wittmer, Naugatuck, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 730 days.

(21) Appl. No.: 12/057,292

(22) Filed: Mar. 27, 2008

(65) Prior Publication Data
US 2009/0242691 A1    Oct. 1, 2009

(51) Int. Cl.
*B64C 27/54* (2006.01)
(52) U.S. Cl. .................. 244/17.13; 244/17.25; 244/228
(58) Field of Classification Search ................ 701/3, 4; 244/17.13, 17.25, 228, 76 R, 221
See application file for complete search history.

(56) References Cited

U.S. PATENT DOCUMENTS

| | | | |
|---|---|---|---|
| 4,481,586 A * | 11/1984 | Skutecki ........................... 701/4 |
| 4,519,743 A | 5/1985 | Ham | |
| 4,534,704 A | 8/1985 | McArdle | |
| 4,669,958 A | 6/1987 | Peyran et al. | |
| 4,696,445 A | 9/1987 | Wright et al. | |
| 5,001,646 A | 3/1991 | Caldwell et al. | |
| 5,076,517 A | 12/1991 | Ferranti et al. | |
| 5,209,429 A | 5/1993 | Doolin et al. | |
| 5,224,664 A | 7/1993 | Adams, Sr. et al. | |
| 5,265,826 A | 11/1993 | Ebert et al. | |
| 5,265,827 A | 11/1993 | Gerhardt | |
| 5,274,558 A | 12/1993 | High et al. | |
| 5,314,147 A | 5/1994 | Ebert et al. | |
| 5,446,666 A | 8/1995 | Bauer | |
| 5,628,620 A | 5/1997 | Arlton | |
| 5,678,786 A * | 10/1997 | Osder ........................ 244/17.13 |
| 5,799,901 A | 9/1998 | Osder | |
| 5,850,615 A | 12/1998 | Osder | |
| 5,907,211 A | 5/1999 | Hall et al. | |
| 6,189,836 B1 * | 2/2001 | Gold et al. ..................... 244/191 |
| 6,231,005 B1 * | 5/2001 | Costes ........................ 244/17.25 |
| 6,322,324 B1 | 11/2001 | Kennedy et al. | |
| 6,453,669 B2 | 9/2002 | Kennedy et al. | |
| 6,459,228 B1 * | 10/2002 | Szulyk et al. .................. 318/632 |
| 6,616,095 B2 | 9/2003 | Stamps et al. | |
| 6,648,269 B2 * | 11/2003 | Gold et al. ................. 244/17.13 |
| 6,886,777 B2 | 5/2005 | Rock | |
| 7,264,199 B2 | 9/2007 | Zientek | |
| 7,742,846 B2 * | 6/2010 | Fanciullo et al. ................. 701/4 |
| 2006/0011777 A1 * | 1/2006 | Arlton et al. .................. 244/7 B |
| 2010/0023186 A1 * | 1/2010 | Sahasrabudhe et al. .......... 701/3 |
| 2011/0006166 A1 * | 1/2011 | Arlton et al. .................. 244/7 A |

* cited by examiner

*Primary Examiner* — Christopher P Ellis
(74) *Attorney, Agent, or Firm* — Carlson Gaskey & Olds P.C.

(57) ABSTRACT

A system and method of controlling a rotary-wing aircraft includes transforming a non-rate limited servo position command into a rate limited servo position command.

14 Claims, 8 Drawing Sheets

SWASHPLATE TRAJECTORY CONTROL

BACKGROUND

The present invention relates to a flight control system, and more particularly to control of a swashplate trajectory.

Control of a rotary-wing aircraft is affected by varying the pitch of the rotor blades individually as the rotor rotates and by varying the pitch of all of the blades together. These are known respectively as cyclic and collective pitch control. Blade pitch control of a rotary wing aircraft main rotor is typically achieved through a swashplate.

The swashplate is typically concentrically mounted about the rotor shaft. The swashplate generally includes two rings connected by a series of bearings with one ring connected to the airframe (stationary swashplate), and the other ring connected to the rotor hub (rotating swashplate). The rotating ring is connected to the rotor hub through a pivoted link device typically referred to as "scissors", with the static ring similarly connected to the airframe. The rotating swashplate rotates relative the stationary swashplate. Apart from rotary motion, the stationary and rotating swashplate otherwise move as a unitary component. Cyclic control is achieved by tilting the swashplate relative to a rotor shaft and collective control is achieved by translating the swashplate along the rotor shaft.

Pitch control rods mounted between the main rotor blades and the rotating swashplate transfer loads between the swashplate and the main rotor blades. Main rotor servos extend between and attach to the stationary swashplate and the aircraft fuselage. Displacement of the main rotor servos results in displacement of the stationary swashplate. Hence, by actuating selected main rotor servos, collective and cyclic commands are transferred to the rotor head as vertical and/or tilting displacement of the swashplates.

Certain limits may be required for the swashplate linkages to operate properly. Typically, the more compact the swashplate, the more complicated the linkage geometry and the greater the number of linkages required to achieve a desired range of motion. Main rotor servo limits may be required to avoid interference relationships within the range of motion.

Main rotor servo rate limits may also prevent exceedences of a hydraulic system capability which drives the main rotor servos. Since a swashplate requires a combination of servo movements to achieve the desired position, individual limitation of servo rates may result in an undesirable trajectory which produces an off-axis response.

SUMMARY

A system according to an exemplary aspect of the present invention includes: a rotational system; a multiple of servos operable to articulate the rotational system; a kinematics model of the rotational system; and a module which performs a servo rate limiting algorithm in response to the kinematics model to transform a non-rate limited servo position command into a rate limited servo position command to drive each of the multiple of servos through a proportional rate reduction of all of the multiple of servos to reduce off-axis coupling in the rotational system.

A method of controlling a rotary-wing aircraft according to an exemplary aspect includes transforming a non-rate limited servo position command into a rate limited servo position command; and driving each of a multiple of main rotor servos through a respective rate limited servo position command having a proportional rate reduction of all of the multiple of main rotor servos to reduce off-axis coupling in a swashplate articulatable by the multiple of main rotor servos to reduce off-axis coupling in the swashplate.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
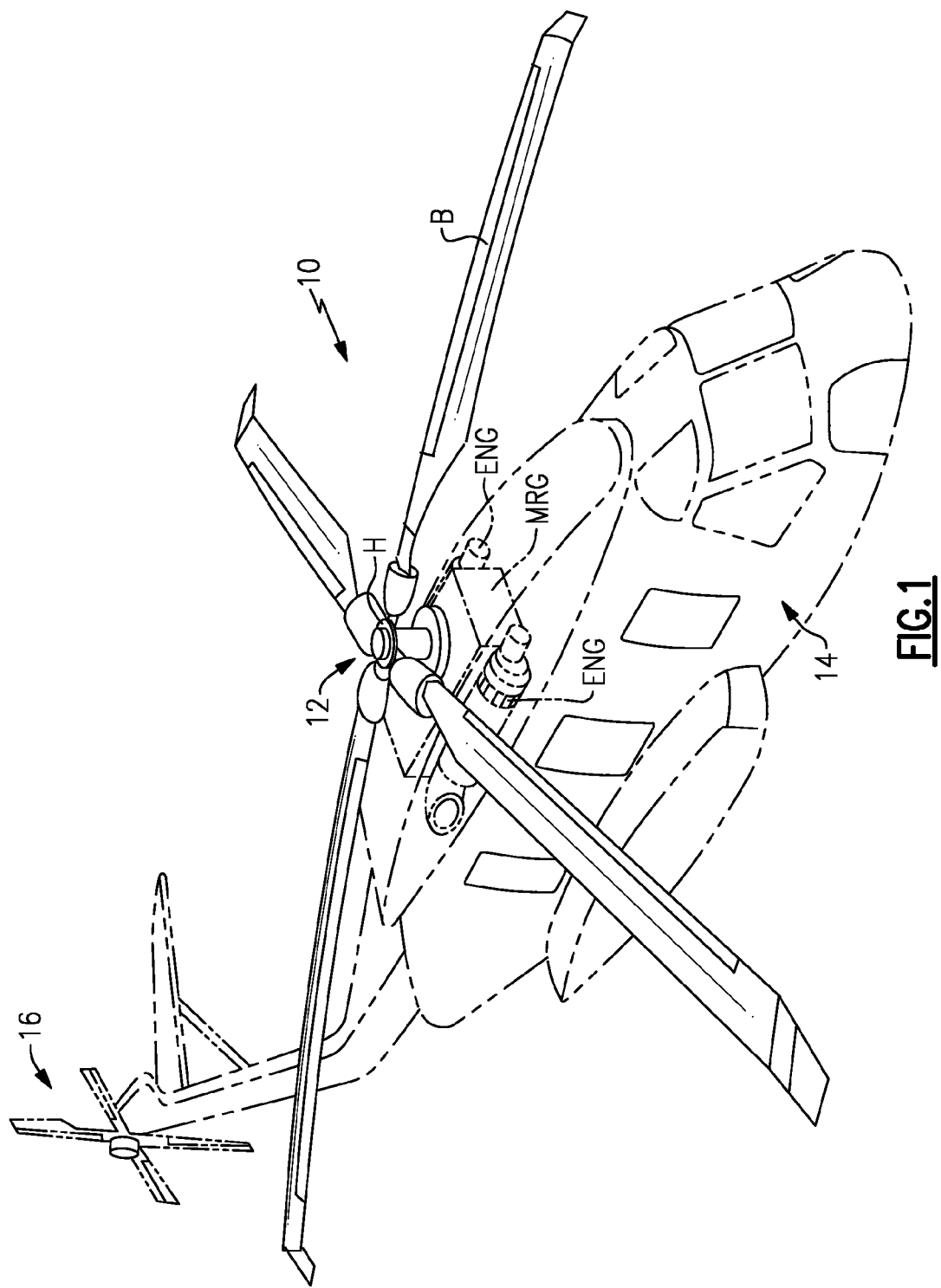
FIG. 1 is a general perspective view of one non-limiting rotary wing aircraft embodiment for use with the present invention.

FIG. 1 schematically illustrates an exemplary vertical take-off and landing (VTOL) rotary-wing aircraft 10. The aircraft 10 in the disclosed, non-limiting embodiment includes a main rotor system 12 supported by an airframe 14 having an extending tail which mounts an anti-torque system 16 such as a tail rotor system. The main rotor system 12 includes a multiple of rotor blades B mounted to a rotor hub H. The main rotor system 12 is driven about an axis of rotation A through a main rotor gearbox MRG by one or more engines ENG. The main gearbox MRG may be interposed between the one or more engines ENG, the main rotor system 12 and the anti-torque system 16 such that the main rotor system 12 and the anti-torque system 16 are both driven by the main gearbox MRG. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
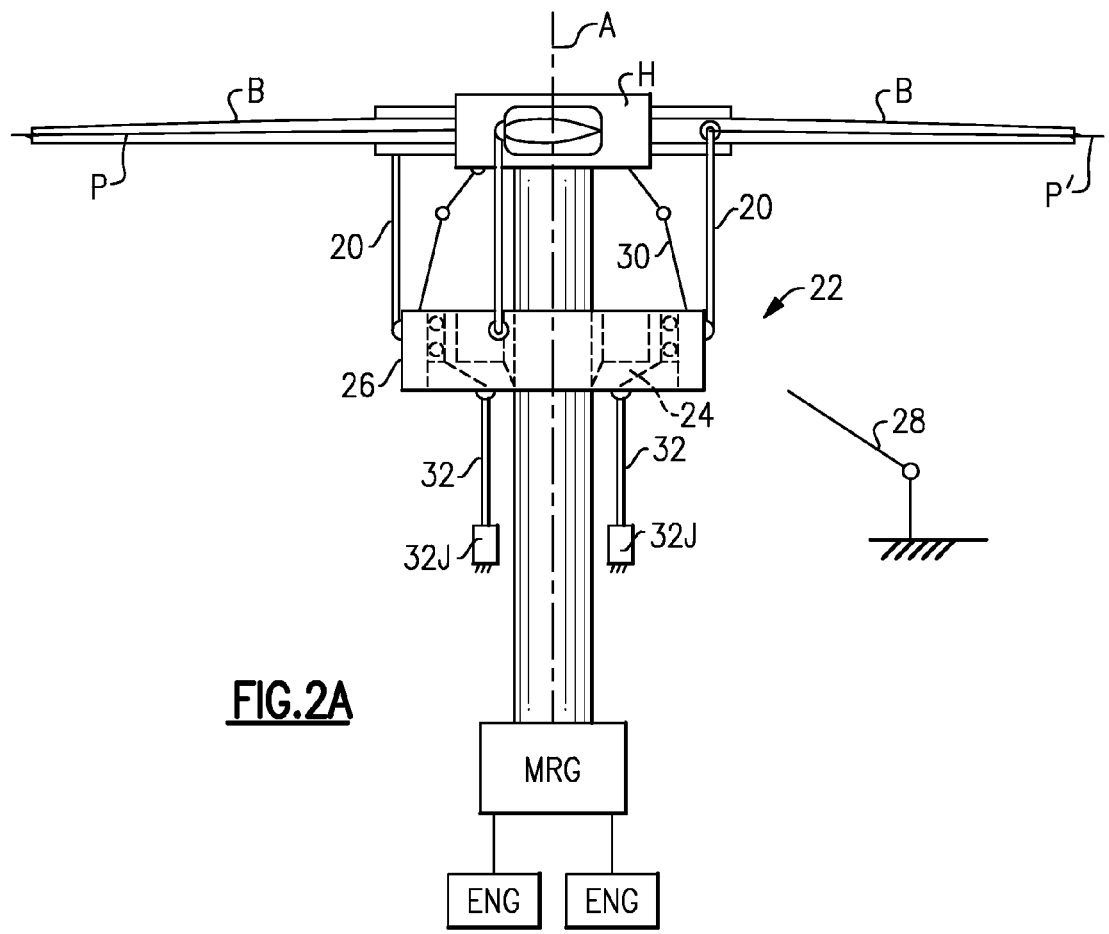
FIG. 2A is a schematic view of a rotor system.

Referring to FIG. 2A, each rotor blade B is mounted to the rotor hub H so as to be flexible about a pitch change axis P. It should be understood that various attachment systems and rotor blade pitch change systems may alternatively or additionally be utilized. Pitch change loads are imparted to each rotor blade B by pitch control rods 20. One end section of each pitch control rod 20 is articulatably connected to the rotor blade B and an opposite end section of the pitch control rod 20 is articulately connected to a swashplate 22. The swashplate 22 converts control movements in the non-rotating reference frame into the rotating reference frame.

Figure 2B:
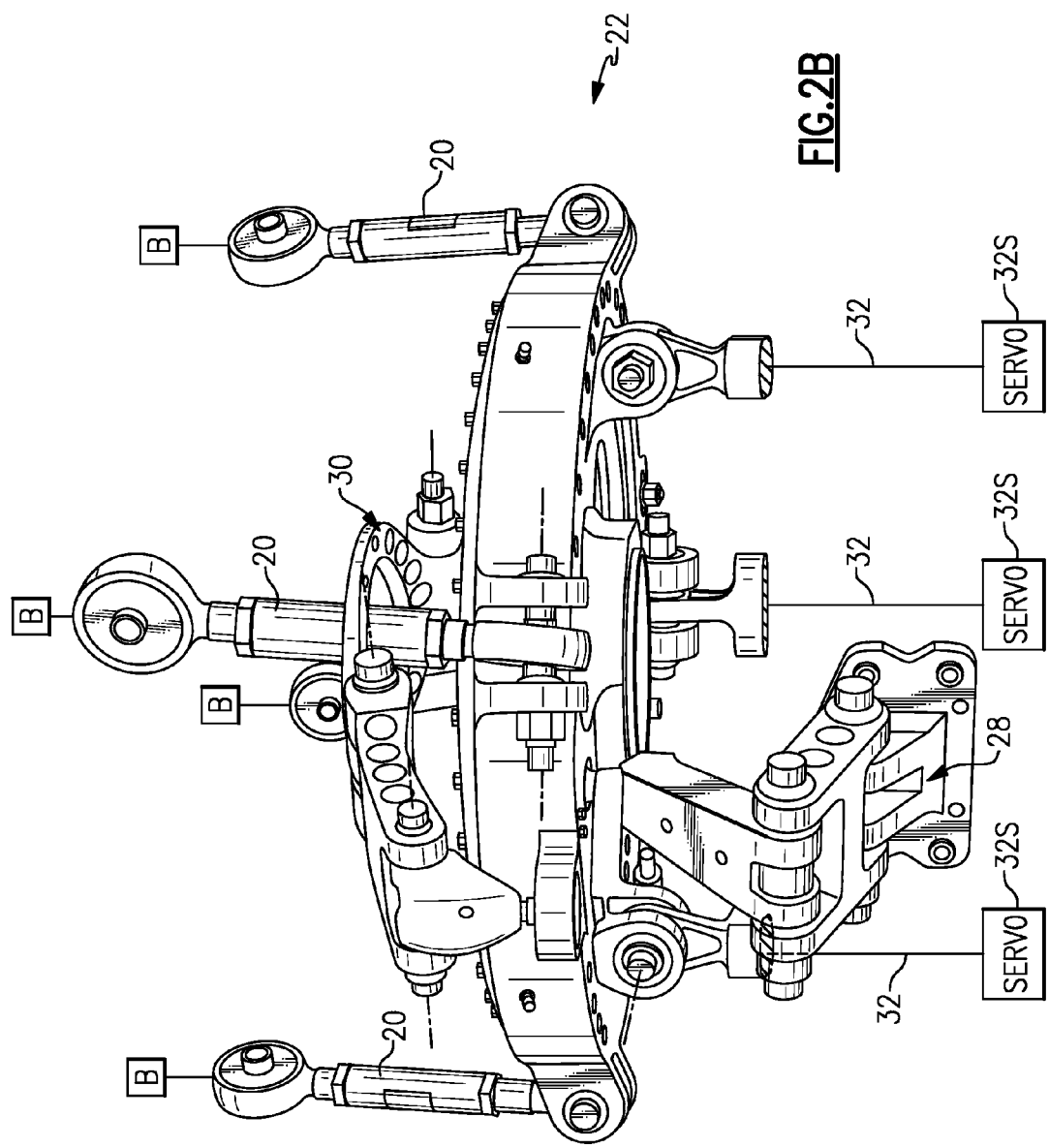
FIG. 2B is a perspective view of one non-limiting embodiment of a swashplate.

The swashplate 22 includes a rotationally stationary swashplate 24 and rotational swashplate 26 which rotates relative to the rotationally stationary swashplate 24 through a bearing system 25. A stationary scissors assembly 28 is mounted between the rotationally stationary swashplate 24 and the airframe 14. A rotational scissors assembly 30 is mounted to the rotational swashplate 26 and the rotor hub H for rotation therewith (also illustrated in FIG. 2B). The swashplate 22 receives control inputs through a set of servo control rods 32 which are each driven by a respective main rotor servo 32S. Three main rotor servos 32S are typical to allow the swashplate 22 to move with three degrees of freedom; however, any other number of main rotor servos may alternatively be utilized.

Pitch control commands imparted through the servo control rods 32 cause tilting of the swashplate 22 about a uniball 34 (FIG. 2C) which defines a central pivot point 36 located along the axis of rotation A. The rotationally stationary swashplate 24 is mounted to the rotor shaft 12 through the uniball 34 that permits tilting of the swashplate 22 about a central pivot point 36 and translation thereof along the axis of rotation A (FIG. 2C).

Figure 2C:
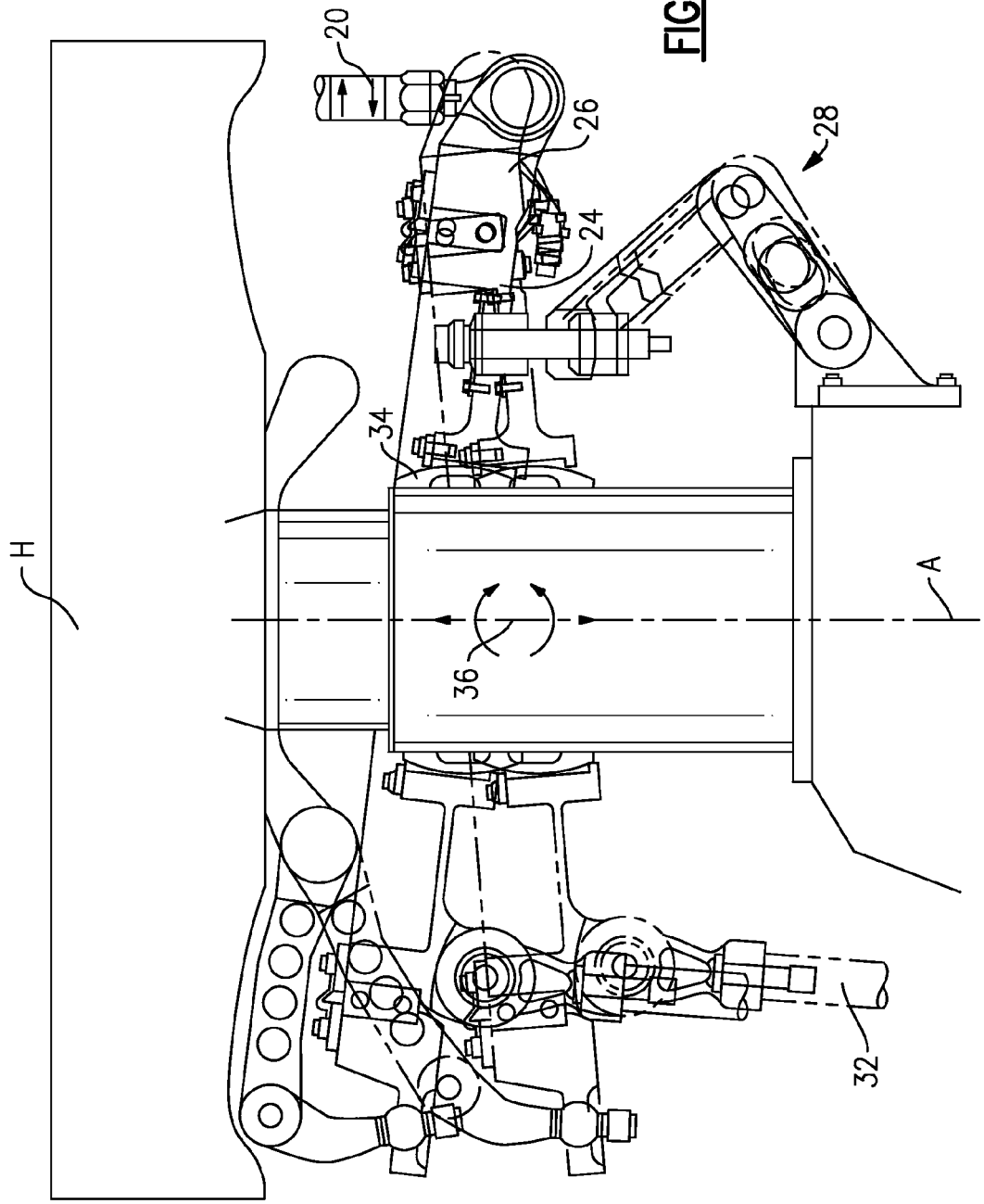
FIG. 2C is a schematic side view of the swashplate tilting about the central pivot point to impart pitch change loads to each rotor blade.

Referring to FIG. 2C, tilting of the swashplate 22 about the central pivot point 36 imparts pitch change loads to each rotor blade B through the pitch control rods 20 which are mounted to the rotational swashplate 26. Articulation of the swashplate 22 drives the pitch control rods 20 which cause the rotor blade B to pitch about the pitch change axis P. When the swashplate 22 translates along axis A, collective pitch change is imparted to the rotor system 12, and cyclic pitch change is imparted when tilted about central pivot point 36.

Figure 3:
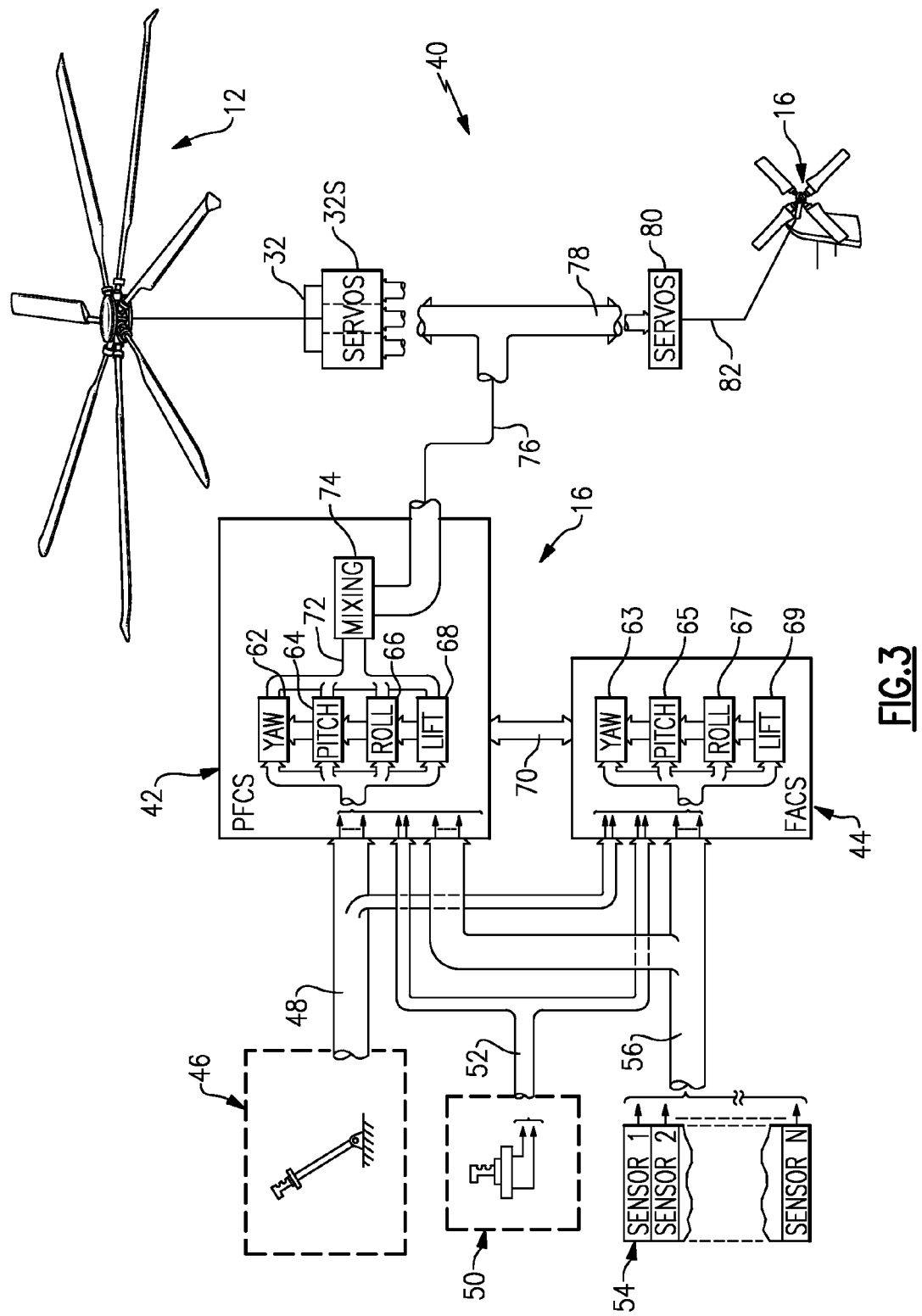
FIG. 3 is a block diagram of a flight control system.

Referring to FIG. 3, a fly-by-wire type flight control system 40 includes a model following control system which shapes the pilot's controller and displacement commands through an inverse vehicle model to produce the desired aircraft response. The system 40 may, in one non-limiting embodiment includes a Primary Flight Control System (PFCS) 42 and an Automatic Flight Augmentation and Cuing System (FACS) 44. The PFCS 42 and FACS 44 execute model following control laws to provide both control and stability augmentation. In this control law architecture, pilot commands are shaped into desired aircraft responses through an architecture which, in one non-limiting embodiment, has electronic control of a swashplate. These desired commands are then passed through an inverse aircraft model to obtain the control commands required to produce the desired response. The difference between the desired command and the aircraft response is also fed back to drive these errors towards zero, thus improving the model following performance.

The PFCS 42 and FACS 44 each receive the displacement output command signals of a collective controller 46 on line 48, a cyclic controller 50 on line 52, and the aircraft's sensed parameter signals from sensors 54, on lines 56. That is, a typical fly-by-wire system converts controller displacements into the electronic command. The collective controller 46 and the cyclic controller 50 may take various forms including sidearm controllers, a yaw pedal system or other such flight controllers.

The PFCS 42 and FACS 44 may each contain separate flight control laws for controlling the yaw, pitch, roll and lift axes of the aircraft. The logic is included in the PFCS and FACS control modules (schematically represented by blocks 62, 64, 66, 68 for the PFCS 42 and blocks 63, 65, 67, 69 for the FACS 44). The sensed parameter signals from aircraft sensors 54, on lines 56, provide the PFCS 42 and FACS 44 with the aircraft angular rate and attitude response to the command signals. The PFCS logic provides rotor command signals and the FACS logic provides conditioning and/or trimming of the PFCS four axis logic functions. The PFCS and FACS logic modules interconnect through bus 70 to provide rotor command signals on output lines 72 to a mixing function 74 which communicates commands on lines 76 for the displacement of the main rotor servos 32S and linkages 32 to control the tip path plane of the main rotor 12. A mixed command signal is also provided on line 78 to the tail rotor servos 80 which control the thrust of the anti-torque system 16 through linkages 82.

Figure 4:
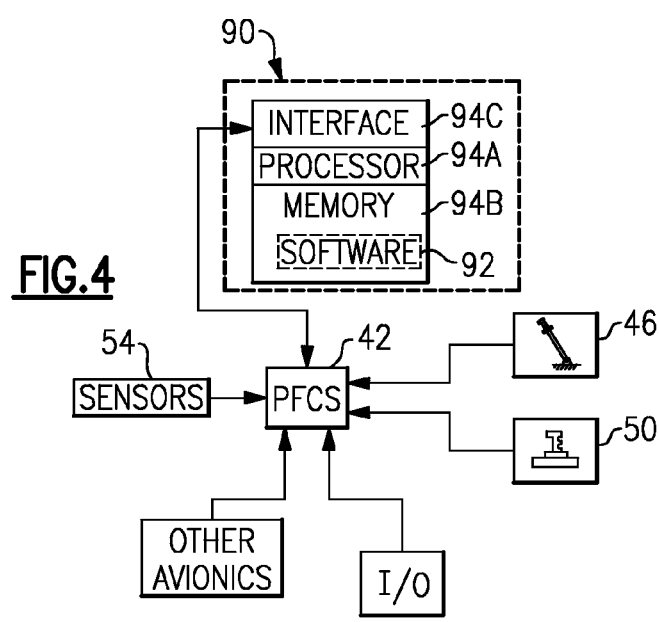
FIG. 4 is a block diagram of a module for a servo rate limiting algorithm.

Referring to FIG. 4, a module 90 (see also FIG. 5) which executes a servo rate limiting algorithm 92 (see also FIG. 6) is schematically illustrated in a block diagram format. Although schematically illustrated as a stand-alone block, the module 90 may be a portion of a flight control computer, or a portion of another system, or module.

The module 90 includes a processor 94A, a memory 94B, and an interface 94C for communicating with the PFCS 42, the collective controller 46, the cyclic controller 50, the sensors 54, and other avionics systems. The memory 94B may, for example only, include FLASH, RAM, ROM, DVD, CD, a hard drive, or other electronic, optical, magnetic, or any other computer readable medium onto which stores the data and control algorithms described herein. The algorithm 92 is the scheme by which the decisions may be made in the disclosed non-limiting embodiments.

Figure 5:
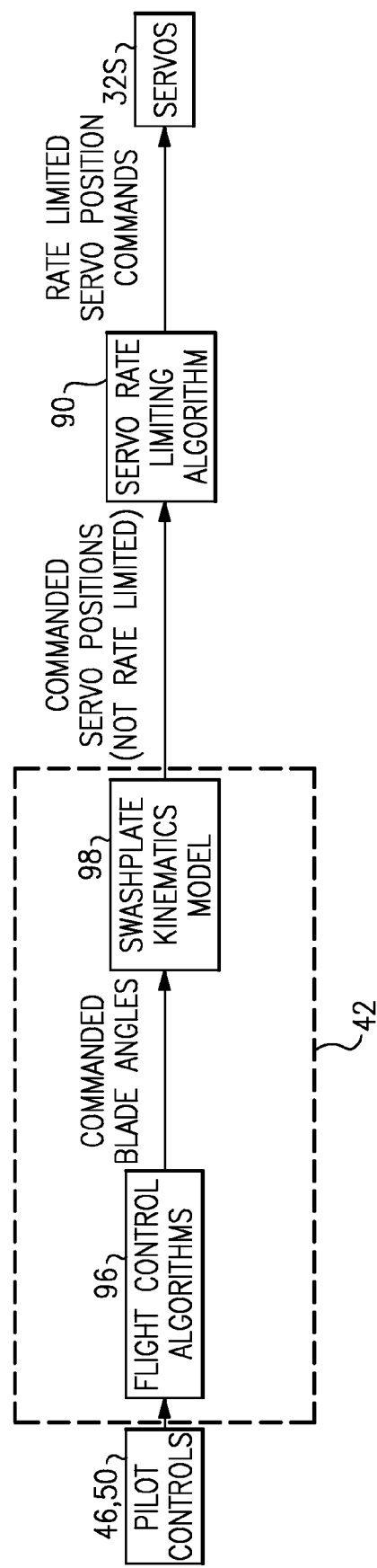
FIG. 5 is a block diagram of one non-limiting embodiment of a module for a servo rate limiting algorithm in communication with portions of a flight control system.

Referring to FIG. 5, the module 90 communicates with, in one non-limiting embodiment, a flight control algorithm 96 and a swashplate kinematics model 98 to implement the servo rate limiting algorithm 92. The flight control algorithm 96 and the swashplate kinematics model may be stored within the PFCS 42 or other portion of the flight control system 40. The servo rate limiting algorithm 92 generates a rate limited servo position command to drive each main rotor servo 32S by reducing the rates of all of the main rotor servos 32S in proportion so as to prevent off-axis coupling.

Figure 6:
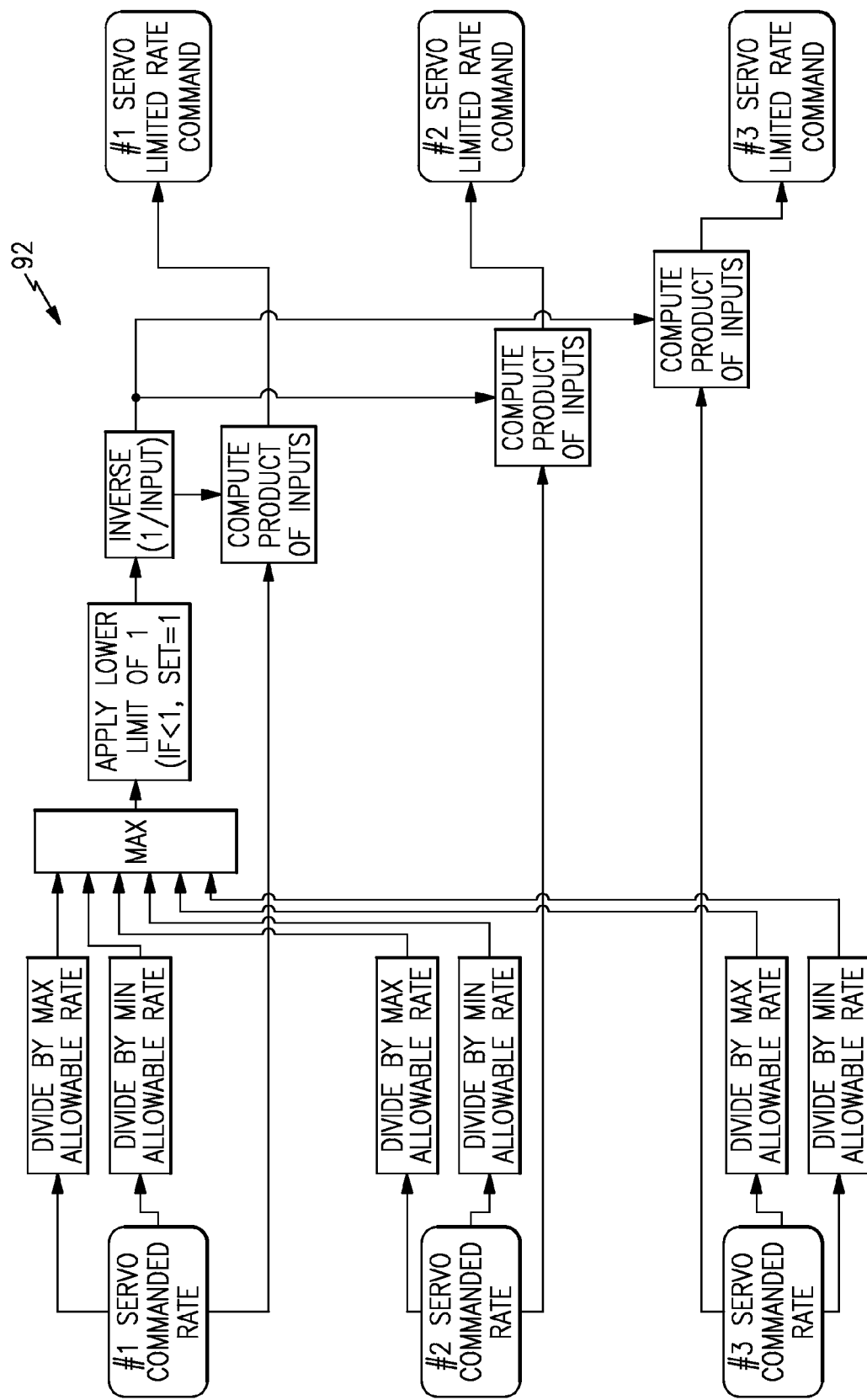
FIG. 6 is a schematic illustrating operation of the servo rate limiting algorithm.
Figure 7:
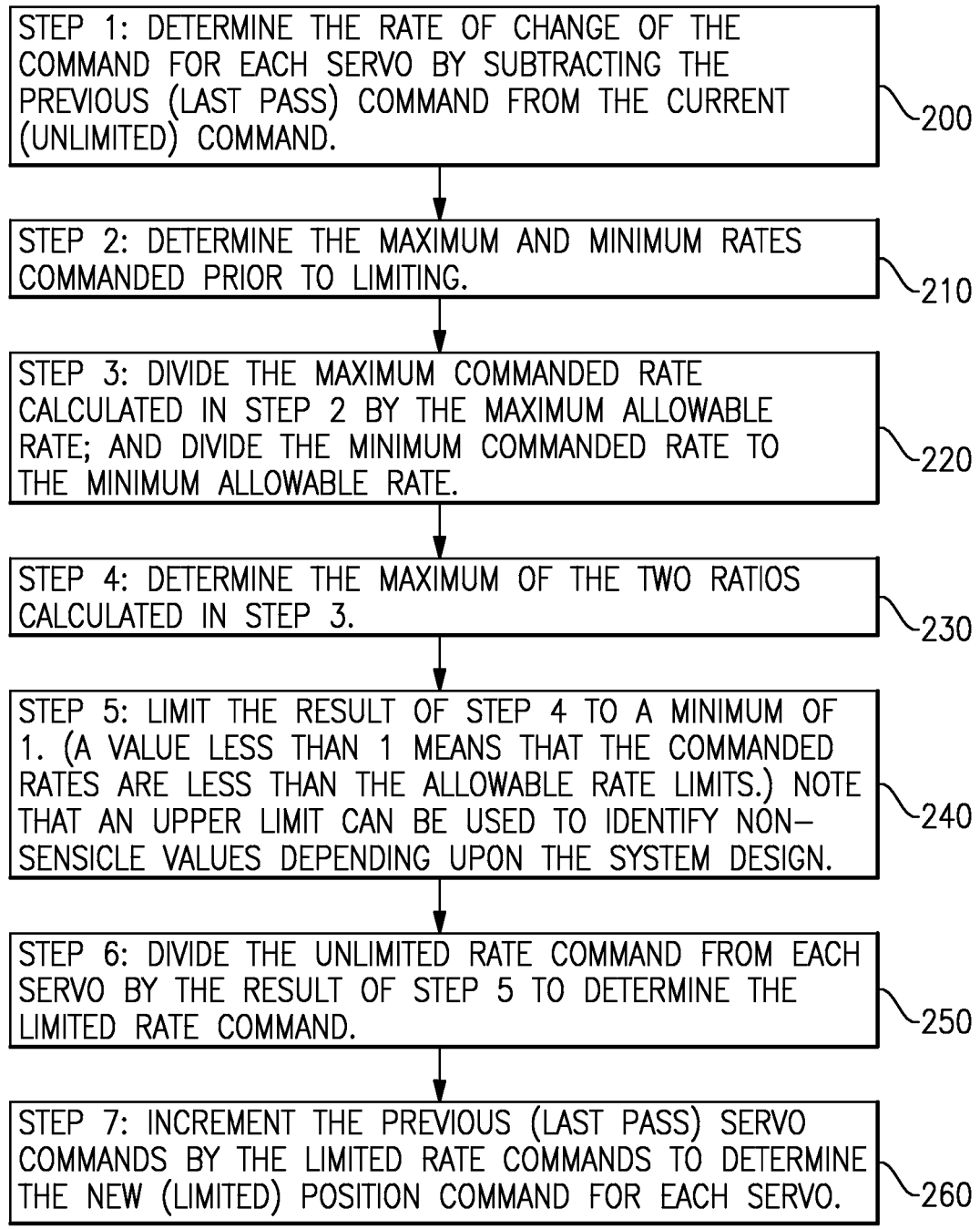
FIG. 7 is a flow chart illustrating operation of the servo rate limiting algorithm.

Referring to FIG. 7, the rate of change of the command for each main rotor servo 32S is determined by subtracting the previous (last pass) command from the current (unlimited) command from the swashplate kinematics model 98 (action 200). The maximum allowable rates and the minimum allowable rates commanded prior to limiting are then determined (action 210). The servo rate limiting algorithm 92 then divides the maximum commanded rate calculated in action 210 by the maximum allowable rate; and divides the minimum commanded rate calculated in action 210 by the minimum allowable rate (action 220). The servo rate limiting algorithm 92 then determines the maximum of the two ratios calculated from action 220 (action 230). Notably, this is performed for each main rotor servo 32S (FIG. 6). The result of action 230 is then limited to a minimum of 1 (action 240). A value less than 1 indicates that the commanded rates are less than the allowable rate limits. It should be understood that a predetermined upper limit may be utilized to identify nonsensical values. The unlimited rate command from each servo is divided by the result of action 240 to determine the limited rate command (action 250). The servo rate limiting algorithm 92 then increments the previous (last pass) servo commands by the limited rate commands to determine the new (rate limited) servo position command. The rate limited servo position command is then communicated to each main rotor servo 32S (action 260). The servo rate limiting algorithm 92 thereby preserves the commanded trajectory rather than the conventional individual application of servo rate limits which may alter the commanded trajectory.

In one numerical example of the servo rate limiting algorithm 92, a rotational system such as a swashplate applies a once per revolution (cyclic) pitch variations of the rotor blade angle ($\theta$) which can be represented mathematically as a function of the main rotor blade azimuth ($\psi$) as:

$$\theta = \theta_0 + \theta_C \cdot \cos\psi + \theta_S \cdot \sin\psi \quad \text{[Equation 1]}$$

For typical swashplate configurations, a linear approximation is sufficient to accurately describe the relationship between the main rotor servo positions to be commanded (s1, s2, s3) and the three parameters which describe the desired motion in the rotating system (θ0, θc, θs), i.e.:

$$S = K \cdot \Theta \text{ where} \quad \text{[Equation 2]}$$

$$S = \begin{pmatrix} s_1 \\ s_2 \\ s_3 \end{pmatrix} \quad K = \begin{pmatrix} k_{11} & k_{12} & k_{13} \\ k_{21} & k_{22} & k_{23} \\ k_{31} & k_{32} & k_{33} \end{pmatrix} \quad \Theta = \begin{pmatrix} \theta_0 \\ \theta_c \\ \theta_s \end{pmatrix}$$

The matrix K represents the linear kinematic transformation between the rotating and non-rotating systems. Taking the time derivative of the kinematic relation describes the servo rate required to match the rotating system command, i.e.:

$$\frac{d}{dt}S = K \cdot \frac{d}{dt}\Theta \quad \text{[Equation 3]}$$

The servo rate limiting algorithm 92 prevents uncommanded motion in the rotating system due to servo rate limiting. The following numerical example is provided to show the effect of the servo rate limiting algorithm 92, but the usefulness thereof shall not be construed as limited to any specific combination of rotating system commands or kinematics.

In this example, the following kinematic matrix is an example representation of the swashplate 22 (FIG. 2B):

$$K = \begin{pmatrix} 4 & 1 & 2 \\ 4 & 2 & -1 \\ 4 & -1 & -2 \end{pmatrix} \quad \text{[Equation 4]}$$

$$K^{-1} = \begin{pmatrix} 0.125 & 0 & 0.125 \\ -0.1 & 0.4 & -0.3 \\ 0.3 & -0.2 & -0.1 \end{pmatrix}$$

If, for example, the desired command is for pure θc, then the main rotor servos will move in the following fashion:

$$\frac{d}{dt}S_{required} = \begin{pmatrix} 1 \\ 2 \\ -1 \end{pmatrix} \cdot \frac{d}{dt}\theta_c \text{ if } \frac{d}{dt}\Theta_{command} = \begin{pmatrix} 0 \\ 1 \\ 0 \end{pmatrix} \quad \text{[Equation 5]}$$

Thus, servo s2 has to move twice as fast as the other servos. To continue with this example, suppose the commanded rate of θc is 1, but the servos are rate limited to between ±1. The resultant limited servo rates without the servo rate limiting algorithm 92 would therefore be:

$$\frac{d}{dt}S_{limited} = \begin{pmatrix} 1 \\ 1 \\ -1 \end{pmatrix} \quad \text{[Equation 6]}$$

which will result in the following rates in the rotating system for this example:

$$\frac{d}{dt}\Theta_{limited} = K^{-1}\left(\frac{d}{dt}S_{limited}\right) = \begin{pmatrix} 0 \\ 0.6 \\ 0.2 \end{pmatrix} \quad \text{[Equation 7]}$$

This example illustrates that without the servo rate limiting algorithm 92 individual servo rate limits reduce the commanded rate in the rotating system as expected, but an uncommanded off-axis command is introduced ($\theta_S$=0.2). For a swashplate 22 in a rotary-wing aircraft, this off-axis command may adversely effects stability and control and/or may result in rotating system commands outside of design limits.

The servo rate limiting algorithm 92 prevents this off-axis coupling by reducing the rates of all of the main rotor servos 32S in proportion. Applying the servo rate limiting algorithm 92 to the above example results in the following:

$$\frac{d}{dt}S_{limited} = \begin{pmatrix} 0.5 \\ 1 \\ -0.5 \end{pmatrix} \quad \text{[Equation 8]}$$

$$\frac{d}{dt}\Theta_{limited} = \begin{pmatrix} 0 \\ 0.5 \\ 0 \end{pmatrix}$$

The off-axis coupling is thereby removed. Although the on-axis rate may be slightly reduced, this is relatively insignificant when compared to the benefits of off-axis command elimination.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A system comprising:
   a rotational system;
   a multiple of servos operable to articulate said rotational system;
   a kinematics model of said rotational system; and a module which performs a servo rate limiting algorithm in response to said kinematics model to transform a non-rate limited servo position command into a rate limited servo position command to drive each of said multiple of servos through a proportional rate reduction of all of said multiple of servos to reduce off-axis coupling in said rotational system.

2. The system as recited in claim 1, wherein said rotational system comprises a swashplate.

3. The system as recited in claim 1, wherein said rotational system comprises a swashplate of a rotary-wing aircraft.

4. An aircraft comprising:
a swashplate;
a multiple of main rotor servos operable to articulate said swashplate;
a swashplate kinematics model of said swashplate; and
a module which performs a servo rate limiting algorithm in response to said swashplate kinematics model to transform a non-rate limited servo position command into a rate limited servo position command to drive each of said multiple of main rotor servos through a proportional rate reduction of all of said multiple of main rotor servos to reduce off-axis coupling in said swashplate.

5. The aircraft as recited in claim 4, wherein said multiple of main rotor servos comprise three main rotor servos.

6. The aircraft as recited in claim 4, wherein said module comprises a controller.

7. The aircraft as recited in claim 4, wherein said module comprises a portion of a flight control system.

8. The aircraft as recited in claim 4, wherein said swashplate kinematics model comprises a portion of a flight control system.

9. A method of controlling a rotary-wing aircraft comprising:
transforming a non-rate limited servo position command into a rate limited servo position command; and
driving each of a multiple of main rotor servos through a respective rate limited servo position command having a proportional rate reduction of all of the multiple of main rotor servos to reduce off-axis coupling in a swashplate articulatable by the multiple of main rotor servos to reduce off-axis coupling in the swashplate.

10. A method as recited in claim 9, further comprising:
determining the rate of change of the non-rate limited servo position command for each of the multiple of main rotor servos;
determining a maximum allowable rate and a minimum allowable rate for each of the multiple of main rotor servos;
determining a first ratio by dividing the maximum rate of change of the non-rate limited servo position command by the maximum allowable rate; and determining a second ratio by dividing the minimum rate of change of the non-rate limited servo position, command by the minimum allowable rate;
selecting the maximum of the first ratio and the second ratio to define a selected ratio;
limiting the selected ratio to a minimum of 1; and
dividing the non-rate limited servo position command from each of the multiple of main rotor servos by the selected, ratio to determine the rate limited servo position command for each of the multiple of main rotor servos.

11. The system as recited in claim 1, wherein said kinematics model includes a kinematic matrix.

12. The system as recited in claim 11, wherein said kinematic matrix mathematically models a swashplate.

13. The system as recited in claim 1, wherein said servo rate limiting algorithm prevents off-axis coupling through a rate reduction of all of said multiple of servos in proportion.

14. The method as recited in claim 9, further comprising preventing off-axis coupling in the swashplate.

* * * * *